United States Patent
Lipsey et al.

(10) Patent No.: US 11,562,566 B2
(45) Date of Patent: Jan. 24, 2023

(54) USE OF ON-SCREEN CONTENT IDENTIFIERS IN AUTOMATED TOOL CONTROL SYSTEMS

(71) Applicant: SNAP-ON INCORPORATED, Kenosha, WI (US)

(72) Inventors: Matthew J. Lipsey, Sherwood, AR (US); David C. Fly, Maumelle, AR (US); Preston C. Phillips, Conway, AR (US); Jason Newport, Conway, AR (US); Cody L. Houston, Conway, AR (US); Joseph Chwan, Mechanicsburg, PA (US); Frederick J. Rogers, North Little Rock, AR (US); Sean W. Ryan, Pleasant Prairie, WI (US)

(73) Assignee: Snap-On Incorporated, Kenosha, WI (US)

( * ) Notice: Subject to any disclaimer, the term of this patent is extended or adjusted under 35 U.S.C. 154(b) by 217 days.

(21) Appl. No.: 17/033,107

(22) Filed: Sep. 25, 2020

(65) Prior Publication Data

US 2021/0089774 A1    Mar. 25, 2021

Related U.S. Application Data

(60) Provisional application No. 62/906,014, filed on Sep. 25, 2019.

(51) Int. Cl.
*G06V 20/20*    (2022.01)
*G06F 40/169*    (2020.01)
(Continued)

(52) U.S. Cl.
CPC .............. *G06V 20/20* (2022.01); *B25H 3/00* (2013.01); *G06F 16/5866* (2019.01);
(Continued)

(58) Field of Classification Search
CPC ...... B25H 3/00; G06F 16/5866; G06F 40/177
See application file for complete search history.

(56) References Cited

U.S. PATENT DOCUMENTS 8,838,618 B1 * 9/2014 Wu ................ G06F 16/322
707/750
10,217,080 B1 * 2/2019 Dutta .............. G06F 16/285
(Continued)

FOREIGN PATENT DOCUMENTS

| GB | 2462858 A | * | 2/2010 | ............. B25H 3/00 |
| WO | WO-2005019991 A2 | * | 3/2005 | ............. G06F 3/147 |

(Continued)

OTHER PUBLICATIONS

International Search Report and Written Opinion dated Dec. 17, 2020 in International Application No. PCT/US2020/052767.

*Primary Examiner* — Asher D Kells
(74) *Attorney, Agent, or Firm* — McDermott Will & Emery LLP

(57) ABSTRACT

An inventory control system comprises an object storage device, a display device, and one or more processors. The object storage device includes a plurality of compartments, in which each compartment has a plurality of storage locations for storing objects. The display device is configured to display information about the object storage device. The one or more processors are configured to establish a description database of objects configured for storage in the inventory control system. The one or more processors retrieve object keywords corresponding to objects stored in the plurality of storage locations of one of the plurality of compartments. The one or more processors also generate a text block based on the retrieved object keywords. On the display device, the one or more processors display a representation of the plurality of compartments of the object
(Continued)

storage device with the text block applied to the one of the plurality of compartments.

15 Claims, 12 Drawing Sheets

(51) Int. Cl.
*G06F 40/177* (2020.01)
*G06F 16/58* (2019.01)
*G06V 20/00* (2022.01)
*B25H 3/00* (2006.01)

(52) U.S. Cl.
CPC .......... *G06F 40/169* (2020.01); *G06F 40/177* (2020.01); *G06V 20/35* (2022.01)

(56) References Cited

U.S. PATENT DOCUMENTS

| | | | |
|---|---|---|---|
| 2003/0102970 A1* | 6/2003 | Creel | G06K 17/00 340/568.1 |
| 2007/0135965 A1 | 6/2007 | Nguyen et al. | |
| 2008/0088454 A1* | 4/2008 | Flores | G07G 1/009 340/572.4 |
| 2009/0072029 A1* | 3/2009 | Martin | B25H 3/028 235/385 |
| 2009/0267769 A1 | 10/2009 | Stevens | |
| 2010/0039513 A1* | 2/2010 | Glickman | G06Q 10/087 382/165 |
| 2010/0045423 A1* | 2/2010 | Glickman | B25H 3/00 340/5.1 |
| 2010/0046791 A1* | 2/2010 | Glickman | G06V 10/56 705/28 |
| 2010/0121482 A1* | 5/2010 | Jackson | G06T 7/0008 726/19 |
| 2011/0025503 A1* | 2/2011 | Weaver | G08B 21/24 340/572.1 |
| 2013/0332323 A1* | 12/2013 | Phillips | G06Q 10/087 705/28 |
| 2014/0101000 A1 | 4/2014 | Falls et al. | |
| 2014/0129475 A1 | 5/2014 | Salvat, Jr. | |
| 2014/0280180 A1 | 9/2014 | Edecker et al. | |
| 2014/0350716 A1 | 11/2014 | Fly et al. | |
| 2017/0293739 A1* | 10/2017 | Fish | G06F 16/2379 |
| 2018/0095138 A1* | 4/2018 | Newport | G01R 31/3646 |
| 2018/0108197 A1* | 4/2018 | Phillips | B25H 3/028 |
| 2021/0118024 A1* | 4/2021 | Sollami | G06F 17/18 |
| 2021/0406993 A1* | 12/2021 | Sethi | G06F 40/56 |

FOREIGN PATENT DOCUMENTS

WO  WO-2016023081 A1 *  2/2016  ............... B25H 3/00
WO     2016168006 A1     10/2016

* cited by examiner

USE OF ON-SCREEN CONTENT IDENTIFIERS IN AUTOMATED TOOL CONTROL SYSTEMS

RELATED APPLICATIONS

This application claims priority to U.S. provisional application No. 62/906,014, filed Sep. 25, 2019, the entire content of which is incorporated herein by reference.

TECHNICAL FIELD

The present subject matter relates to automated tool control systems, and to techniques and equipment to managing automated tool control systems.

BACKGROUND

When tools are used in a manufacturing or service environment, it is important that tools be returned to a storage unit, such as a tool box, after use. Some industries have high standards for inventory control of tools, for example to prevent incidents of leaving tools in the workplace environment where the tools left behind could cause severe damage. In the aerospace industry, for instance, it is important to ensure that no tools are accidentally left behind in an aircraft or missile being manufactured, assembled, or repaired in order to prevent foreign object damage (FOD) to the aircraft.

Some toolboxes include built-in inventory determination features to track inventory conditions of tools stored in those toolboxes. For example, the tools may have assigned tool storage locations within the toolboxes. Some toolboxes include contact sensors, magnetic sensors, or infrared sensors in or next to each tool storage location, to detect whether a tool is placed in each assigned tool storage location. Based on signals generated by the sensors, the toolboxes are able to determine whether any tools are missing from the toolboxes. That is, if a tool is not returned to its assigned tool storage location, the tool may also be marked as missing even when the user returns the tool to the toolbox.

To reduce the risk of erroneously determining that a tool is missing, the currently implemented returning process graphically assists the user to return the tool to the appropriate tool storage location. Thus, even those users who are not familiar with the layout of the toolbox can easily be guided to the appropriate tool storage location for returning the tool.

However, unlike the returning process, the currently implemented check-out process for checking tools out from the toolboxes relies on user's familiarity with the tools and the storage locations of the tools within the drawers. That is, if the user is not familiar with the tools and the tool storage location, more time is spent searching for the tool and there is a higher risk of the user checking out incorrect tools.

Accordingly, there is a need for an improved system that prevents the users from checking out incorrect tools while reducing the time spent for checking the tools out of the toolboxes.

DETAILED DESCRIPTIONS

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

To address the issues described in the Background, automated tool control systems have been developed which visually assist users in checking tools out from toolboxes.

Reference now is made in detail to the examples illustrated in the accompanying drawings and discussed below.

Figure 1:
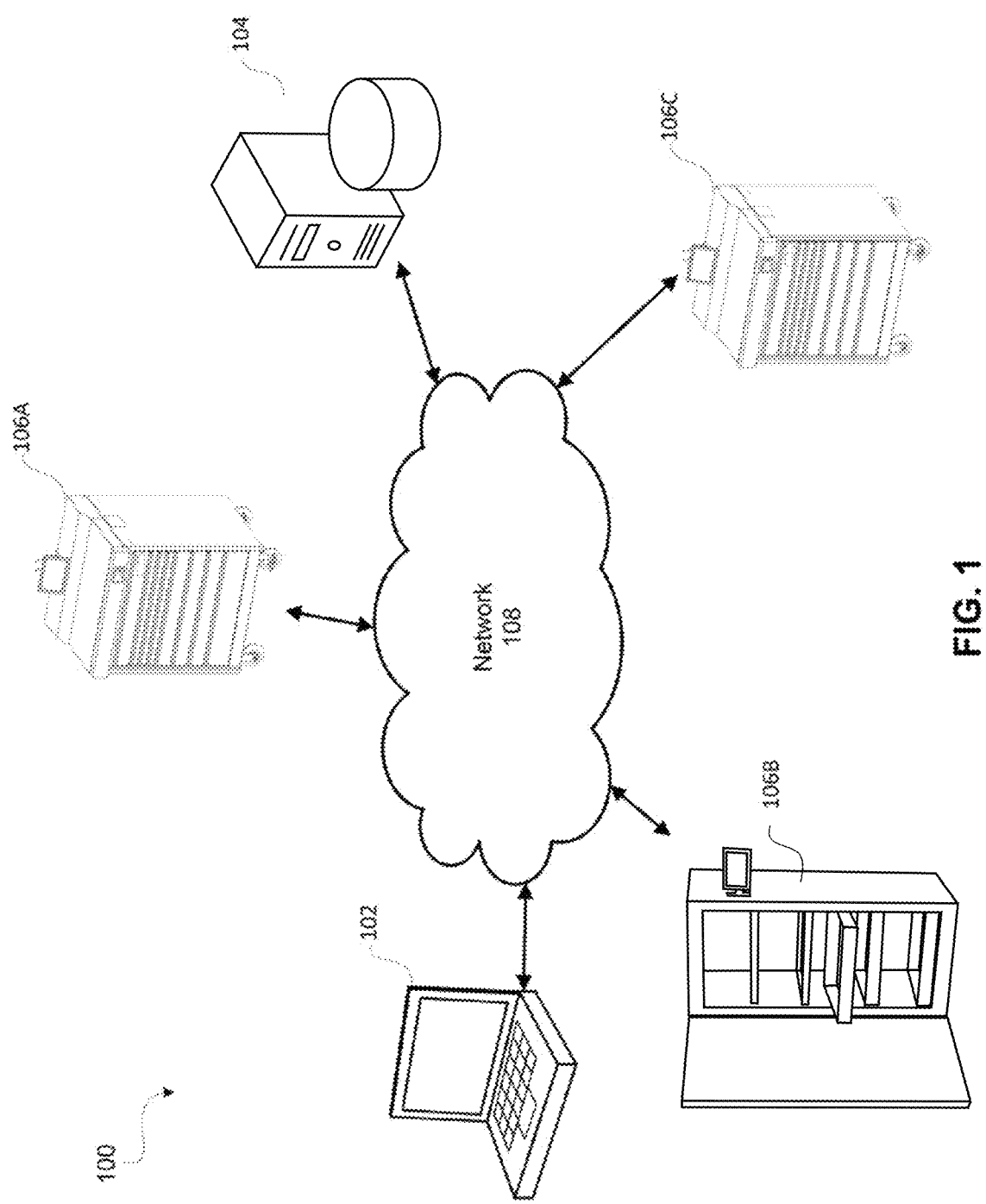
FIG. 1 illustrates an exemplary automated tool control (ATC) system according to example aspects of the subject technology.

FIG. 1 illustrates an exemplary automated tool control (ATC) system 100 according to example aspects of the subject technology. The ATC system 100 includes a computing device 102, a database 104, tool control storage devices 106A, 106B, and 106C (hereinafter collectively referred to as "tool control storage devices 106"), and a network 108. In some aspects, the ATC system 100 can have more or fewer computing devices (e.g., 102), databases (e.g., 104), and/or tool control storage devices (e.g., 106A, 106B, and 106C) than those shown in FIG. 1.

The computing device 102 can represent various forms of processing devices that have a processor, a memory, and communications capability. The processor may execute computer instructions stored in memory. The computing device 102 is configured to communicate with the database 104 and the tool control storage devices 106 via the network 108. By way of non-limiting examples, processing devices can include a desktop computer, a laptop computer, a handheld computer, a personal digital assistant (PDA), or a combination of any of these processing devices or other processing devices.

The computing device 102 may have applications installed thereon. For example, the applications may include an administrative client software application for automatically managing system user access data, item issue and return data, item status (i.e., lost, broken, calibration due, etc.).

The database 104 is a data storage for storing data associated with tools in the tool control storage devices 106 and the system users.

The tool control storage devices 106 (i.e., 106A, 106B, and 106C) each has a processor, a memory, and communications capability. The processor may execute computer instructions stored in memory. The tool control storage device 106 has a data link, such as a wired or wireless link, for exchanging data with the administrative client software application on the computing device 102 and the database 104. The tool control storage devices 106 transfer and receive data to and from the database 104 via the network.

The tool control storage device 106 is a toolbox in some embodiments. The tool control storage devices 106 may more generally be tool lockers or any other secure storage devices or enclosed secure storage areas (e.g., a tool crib or walk-in tool locker). Each of the tool control storage devices 106 is an example of a highly automated inventory control system that utilizes multiple different sensing technologies for identifying inventory conditions of objects in the storage unit. In one example, the tool control storage devices 106 use machine imaging or RF sensing methodologies for identifying inventory conditions of objects in the storage unit.

Illustrative features include the ability to process complex image data with efficient utilization of system resources, autonomous image and camera calibrations, identification of characteristics of tools from image data, adaptive timing for capturing inventory images, efficient generation of reference data for checking inventory status, autonomous compensation of image quality, etc. Further features include the ability to emit and receive RF sensing signals such as RF identification (RFID) signals, to process the received signals to identify particular tools, and to cross-reference tool information obtained through the multiple different sensing modalities (e.g., camera and RFID based modalities) to provide advanced features.

The network 108 may include wired or wireless connections. The network 108 allows the computing device 102, the database 104, and the tool control storage devices 106 to communicate with one another. For example, the network 108 may include a LAN, a WAN, or an Intranet, or a network of networks, for example, the Internet.

Figure 2:
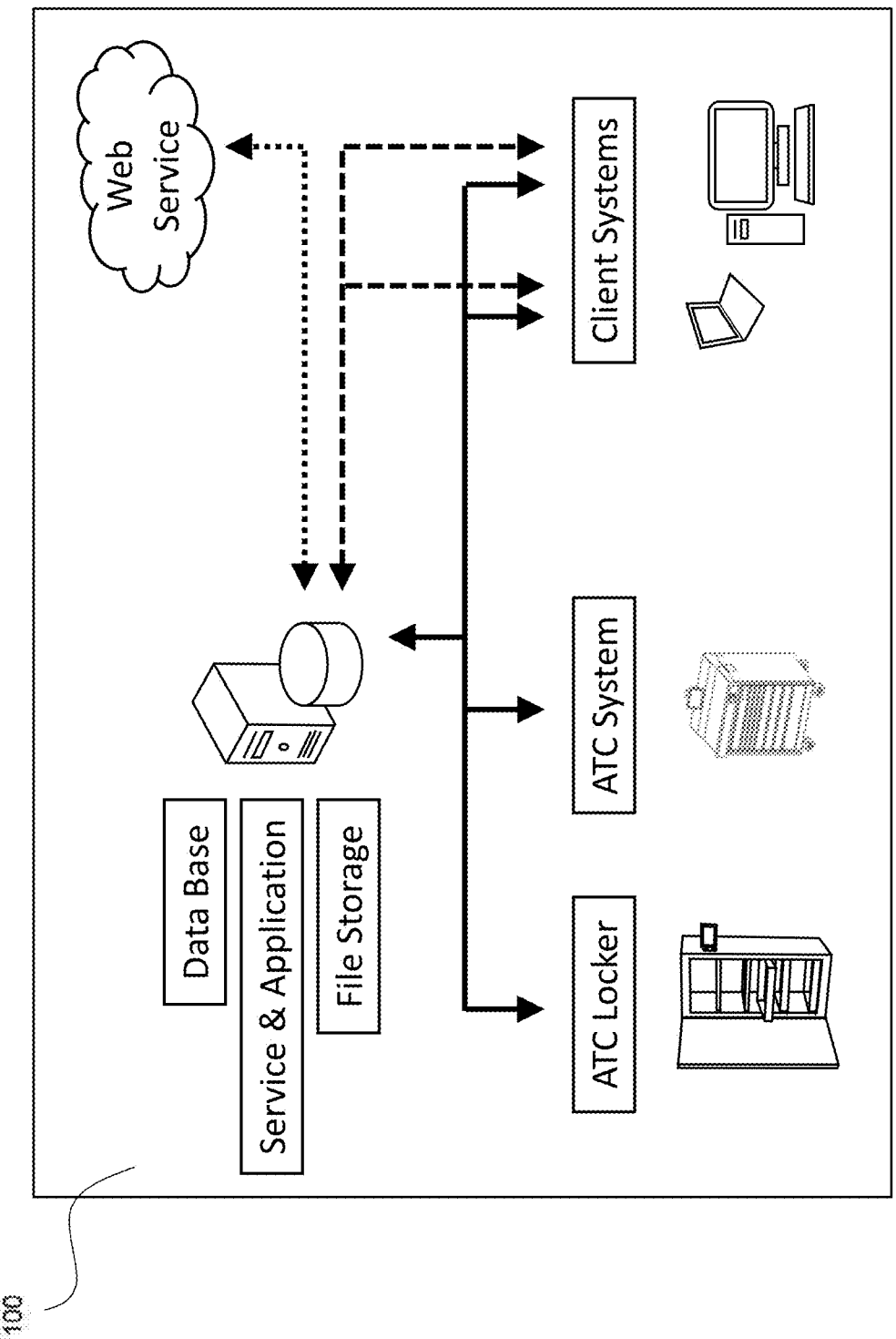
FIG. 2 illustrates an exemplary automated tool control system according to example aspects of the subject technology.

FIG. 2 illustrates an exemplary automated tool control system 100 according to example aspects of the subject technology. Customer Client Systems of FIG. 2 may correspond to the computing device 102 of FIG. 1. Database in FIG. 2 may correspond to the database 104 of FIG. 1. Automated Tool Control (ATC) Locker and ATC System of FIG. 2 may correspond to the tool control storage devices 106 of FIG. 1. Specifically, FIG. 2 illustrates detailed examples of the operating systems that may be used by the computing device 102, the database 104, and tool control storage devices 106, and the connections that may be used by the computing device 102, the database 104, and tool control storage devices 106 to communicate with one another.

Figure 3A:
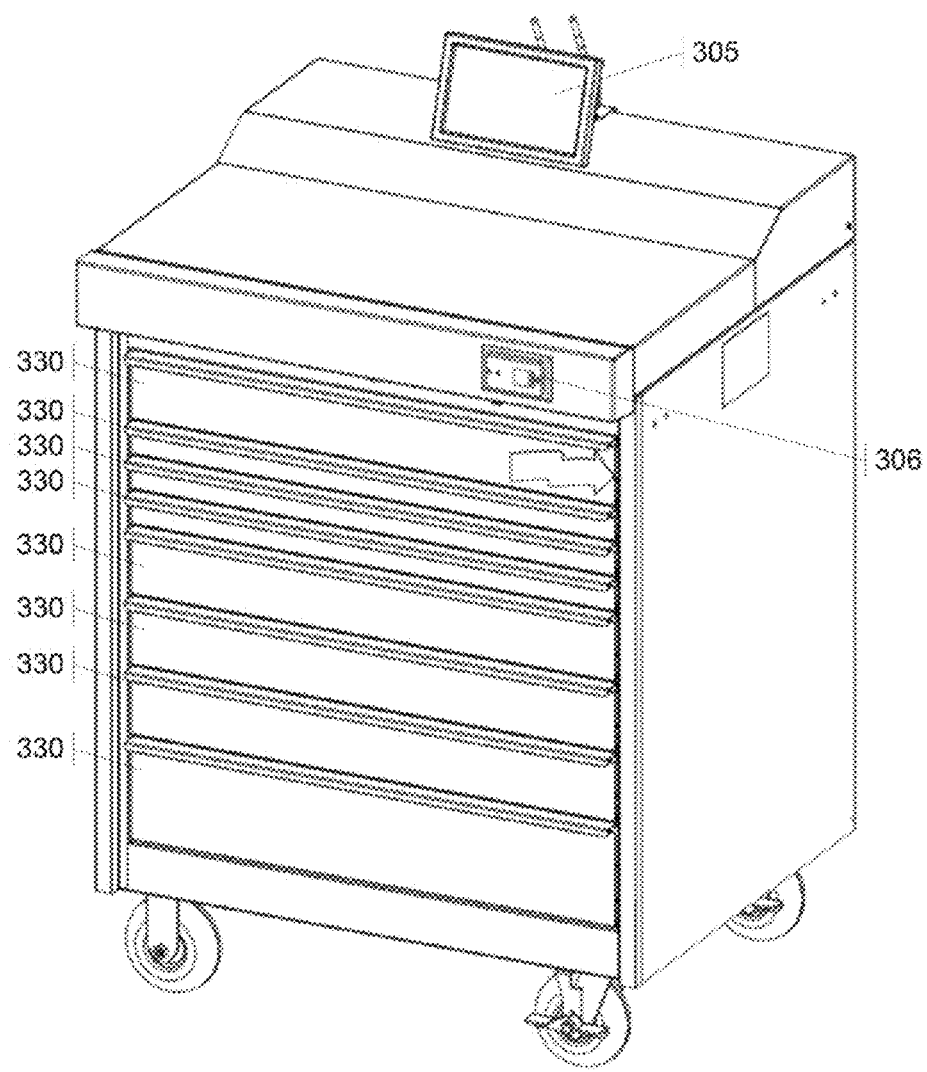
FIG. 3A illustrates a drawer-type tool control storage device according to some embodiment of this disclosure.
Figure 3B:
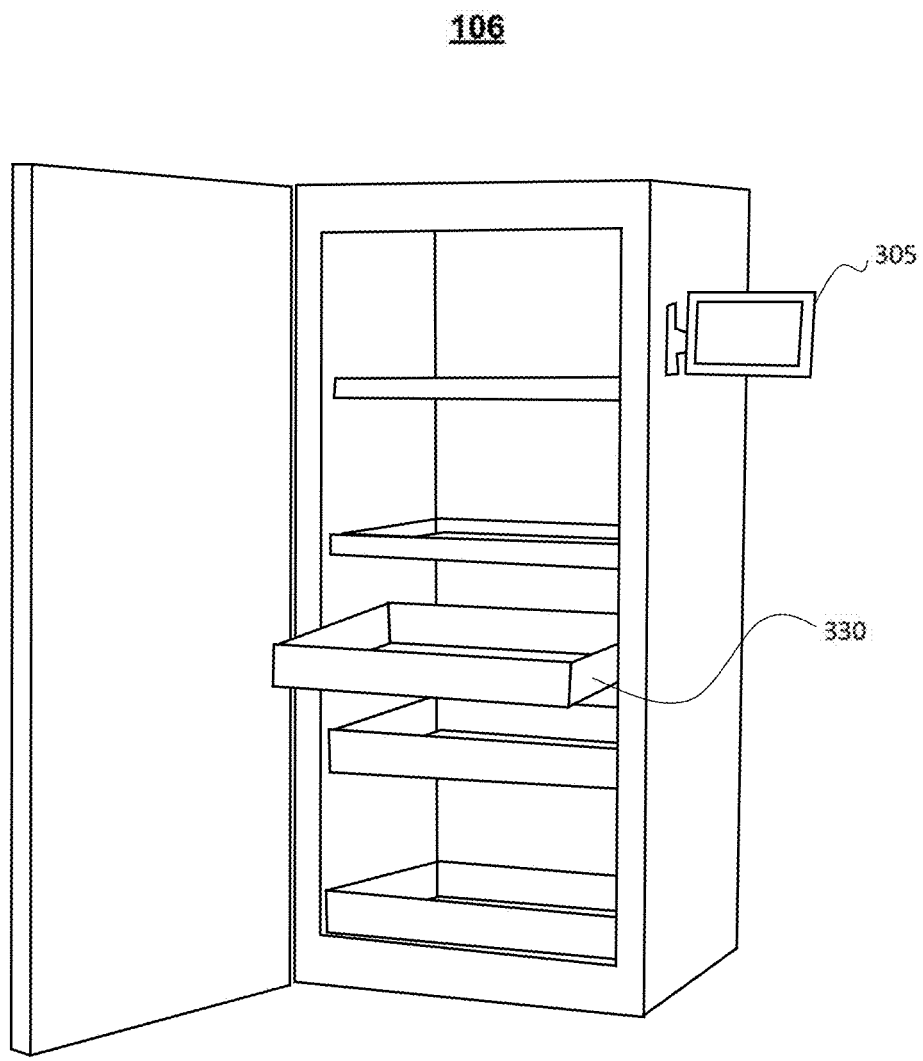
FIG. 3B illustrates a locker-type tool control storage device according to some embodiment of this disclosure.

FIGS. 3A and 3B illustrate various exemplary tool control storage devices 106. FIG. 3A illustrates a drawer-type tool control storage device 106 that includes a user interface 305, an access control device 306, such as a card reader, for verifying identity and authorization levels of a user intending to access tool control storage device 106, and multiple tool storage drawers 330 for storing tools. Instead of drawers 330, the tool control storage device 106 may include shelves, compartments, containers, or other object storage devices from which tools or objects are issued and/or returned, or which contain the storage device from which the objects are issued and/or returned. In further examples, the tool control storage device 106 includes storage hooks, hangers, toolboxes with drawers, lockers, cabinets with shelves, safes, boxes, closets, vending machines, barrels, crates, and other material storage means. FIG. 3B illustrates a locker-type tool control storage device 106.

User interface 305 is an input and/or output device of the tool control storage device 106, configured to display information to a user. Information may include work instructions, tool selection, safety guidelines, torque settings, system and tool status alerts and warnings. For instance, the user interface 305 may be configured to display the information in text strings and images in the default language assigned to the user who currently has access to the tool control storage device 106. Although not illustrated in FIGS. 2A and 2B, the tool control storage device 106 may include speakers as another output device of the tool control storage device 106 for outputting the information.

The access control device 306 authenticates a user's authorization for accessing ATC system 100. Specifically, the access control device 306 is used to limit or allow access to the tool storage drawers 330. The methods and systems used to electronically identify the user requesting access may include any one or more of the following technologies, and others not mentioned, individually or in combination: RFID proximity sensors with cards; magstripe cards and scanners; barcode cards and scanners; common access cards and readers; biometric sensor ID systems, including facial recognition, fingerprint recognition, handwriting analysis, iris recognition, retinal scan, vein matching, voice analysis, and/or multimodal biometric systems.

The access control device 306, through the use of one or more electronically controlled locking devices or mechanisms which may respond to voltage signals relating to unlock/lock commands, keeps some or all the storage drawers 330 locked in a closed position until access the control device 306 authenticates a user's authorization for accessing the tool control storage device 106. If the access control device 306 determines that a user is authorized to access the tool control storage device 106, it unlocks some or all of the storage drawers 330, depending on the user's authorization level, allowing the user to remove or replace tools. In particular, the access control device 306 may identify predetermined authorized access levels to the system, and allow or deny physical access by the user to the three dimensional space or object storage devices based on those predetermined authorized levels of access.

The tool control storage device 106 includes several different sensing subsystems. In an illustrative example, the tool control storage device 106 includes a first sensing subsystem in the form of an image sensing subsystem configured to capture images of contents or storage locations of the system. The image sensing subsystem may include lens-based cameras, CCD cameras, CMOS cameras, video cameras, or any types of device that captures images. The tool control storage device 106 may further include a second sensing subsystem that, in one example, takes the form of an RFID sensing subsystem including one or more RFID antennas, RFID transceivers, and RFID processors. The RFID sensing subsystem is configured to emit RF sensing signals, receive RFID signals returned from RFID tags mounted on or incorporated in tools or other inventory items in response to the RF sensing signals, and process the received RFID signals to identify individual tools or inventory items.

Figure 4A:
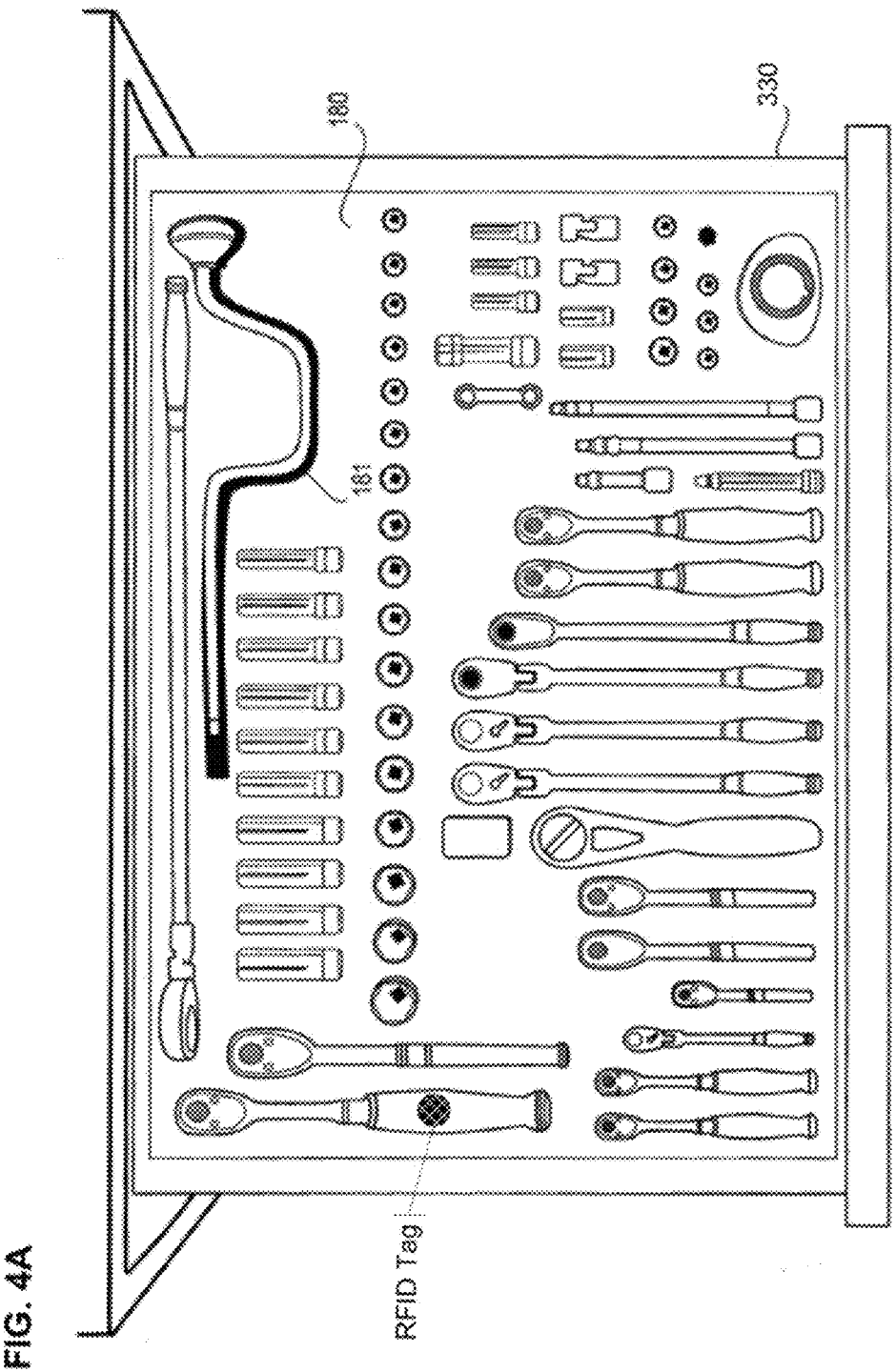
FIG. 4A illustrates an exemplary storage drawer that includes a foam base according to example aspects of the subject technology.
Figure 4B:
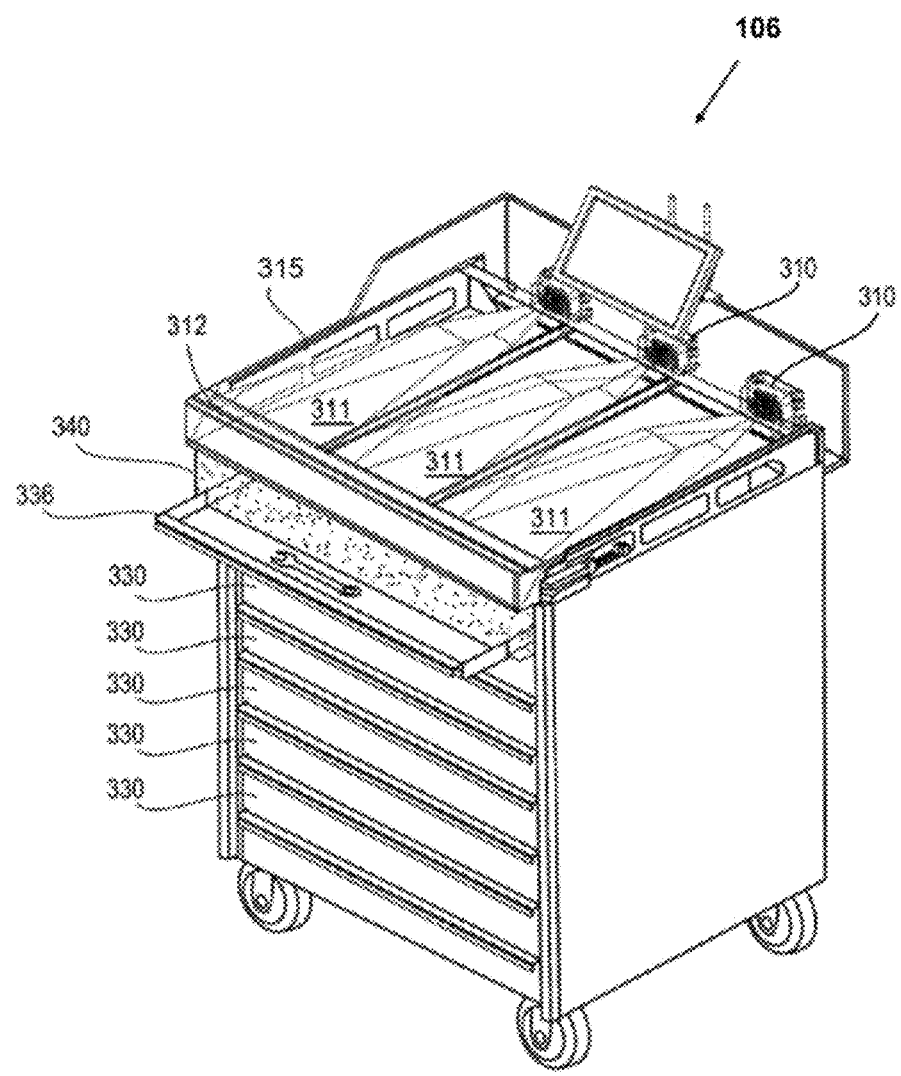
FIG. 4B shows a perspective view of an imaging subsystem in the tool control storage device according to an embodiment.

While FIGS. 4A and 4B correspond to the specific embodiment of the tool control storage device 106 shown in FIG. 1, the teachings illustrated in FIGS. 4A and 4B can be applied to each of the embodiments of FIG. 1. FIG. 4A shows a detailed view of one drawer 330 of the tool control storage device 106 in an open position. The image sensing subsystem is described in further detail below in relation to FIG. 4B.

In some embodiments, as illustrated in FIG. 4A, each storage drawer 330 includes a foam base 180 having a plurality of storage locations, such as tool cutouts 181, for storing tools. Each cutout is specifically contoured and shaped for fittingly receiving a tool with corresponding shapes. Tools may be secured in each storage location by using hooks, Velcro, latches, pressure from the foam, etc. In general, each storage drawer 330 includes multiple storage locations for storing various types of tools. As used throughout this disclosure, a storage location is a location in a storage system for storing or securing objects. In one embodiment, each tool has a specific pre-designated storage location in the tool storage system.

FIG. 4B shows a perspective view of an imaging subsystem in the tool control storage device 106 according to an embodiment. As illustrated in FIG. 3B, the tool control storage device 106 includes an imaging compartment 315 which houses an image sensing subsystem comprising three cameras 310 and a light directing device, such as a mirror 312 having a reflection surface disposed at about 45 degrees downwardly relative to a vertical surface, for directing light reflected from the drawers 330 to the cameras 310. The directed light, after arriving at the cameras 310, allows the cameras 310 to form images of the drawers 330. The shaded area 340 below the mirror 312 represents a viewing field of the imaging sensing subsystem of the tool control storage device 106. As shown at 340, the imaging subsystem scans a portion of an open drawer 336 that passes through the field of view of the imaging sensing subsystem, for example as the drawer 336 is opened and/or closed. The imaging subsystem thereby captures an image of at least that portion of the drawer 336 that was opened. Processing of the captured image is used to determine the inventory conditions of tools and/or storage locations in the portion of the drawer 336 that was opened.

In general, the image sensing subsystem captures an image of a particular drawer 330 and performs an inventory of the drawer in response to detecting movement of the particular drawer. For example, the image sensing subsystem may perform an inventory of the drawer in response to detecting that the drawer is closing or has become completely closed. In other examples, the image sensing subsystem may image the drawer both as it is opening and as it closes.

The inventory is assigned to each of the drawers of the toolboxes using the data file (e.g., text file). The data provided in the data file and loaded in the tool data database can include, for example, information associating with each entry a customer (e.g., customer name or unique identifier), a storage device name (e.g., identifying a particular tool box or other storage device in which the tool or object is to be stored), a drawer identifier (e.g., identifying a particular drawer of the tool box or other storage device in which the tool or object is to be stored), a silhouette name, location, and shape identifier (e.g., a tool silhouette on the basis of which the system determines presence or absence of the tool from storage), an object description (e.g., a name for the tool), and information on channels and/or holes (e.g., channels and holes contiguous with object or tool storage locations and designed to enable users' fingers to grasp the objects or tools from the storage locations).

In some embodiments, the data files are sorted by drawers. For example, when the image sensing subsystem captures an image of a region of interest, the system senses presence and absence of the tools in the in the silhouettes in the drawer based on the data file (e.g., text file) associated with the drawer.

In some embodiments, the RF sensing subsystem is configured to perform inventory checks of drawers or shelves having RF-based tags associated therewith. The RF-based tags may be RFID tags that are attached to or embedded within the tools. In general, the RF-based tag encodes an identifier unique to the tool, such that both the tool type (e.g., screwdriver, torque wrench, or the like) and the unique tool (e.g., a particular torque wrench, from among a plurality of torque wrenches of the model and type) can be identified from reading the RF-based tag. In particular, the information encoded in the RF-based tag is generally unique to the tool such that it can be used to distinguish between two tools that are of a same type, same model, same age, same physical appearance, etc.

For example, the RF sensing subsystem performs an RF-based scan of the tool control storage device 106 when a drawer or compartment storing tools having RF identification tags is completely closed. In particular, the RF-based scan can be performed in response to detecting that the drawer has been completely closed, or performed at any time when the drawer is completely closed. In some examples, the RF-based scan can also be triggered by a user logging into or logging out of the tool control storage device 106. In general, an RF-based scan can be performed in response to similar triggers causing a camera-based inventory of the tool control storage device 106 to be performed.

The data processing system includes one or more processors (e.g., microprocessors) and memory storing program instructions for causing the tool control storage device 106 to communicate electronically directly or through a network with sensing devices and obtain data from sensing devices relative to the presence or absence data of objects within the three dimensional space or object storage device. Images, RFID signals, and other sensing signals captured or received by the sensing subsystems are processed by the data processing system for determining an inventory condition of the system or each storage drawer. The term inventory condition as used throughout this disclosure means information relating to an existence/presence or non-existence/absence condition of objects in the storage system.

In some embodiments, based on the RFID sensing system and the image sensing system present in the tool control storage device 106, a cross-check may be performed between the results of the RFID-based inventory scan and the image-based inventory scan to ensure that the results of the two scans are consistent. Specifically, the inventory cross-check is performed to ensure that both inventory scans have identified the same tools as being present in the tool control storage device 106 and have identified the same tools as being absent from the tool control storage device 106. User alerts are issued if the results of the two inventory scans are not consistent with each other.

Other sensing systems used in inventory of the tool control storage device 106 may include:
  Optical identification sensors, such as: sensors for detecting one dimensional barcodes with line scanner/camera; sensors for detecting two dimensional barcodes with camera/other imaging sensor; machine vision identification sensors with camera/other imaging sensor (using various sensing approaches, including UV, infrared (IR), visible light, or the like); and laser scanning;

RF identification sensors, such as: RFID tags affixed to/embedded in tools (active RFID tags and/or passive RFID tags); other RF technologies used in similar capacity, such as Ruby, Zigbee, WiFi, NFC, Bluetooth, Bluetooth lower energy (BLE), or the like;

Direct electronic connection to tool, such as: tools that have attached/embedded connectors that plug into identification system (as opposed to wireless);

Weight sensor(s), such as: scales to detect weight of objects; multiple scales to detect weight distribution;

Contact switches/sensors, such as: single go/no-go sensors; array of sensors to detect shape/outline;

Sonic emitter/detector pair; and/or

Magnetic induction/sensing, such as ferrous tool locator products.

Figure 5A:
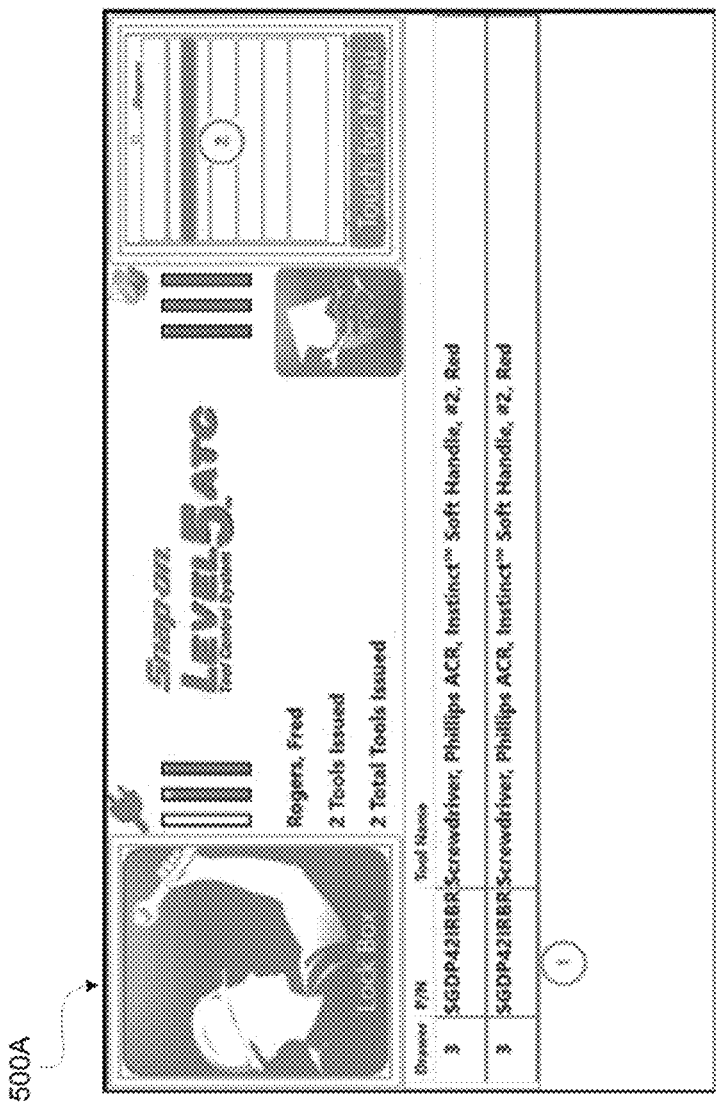
FIG. 5A illustrates an exemplary graphical user interface (GUI) according to some embodiment of this disclosure.
Figure 5B:
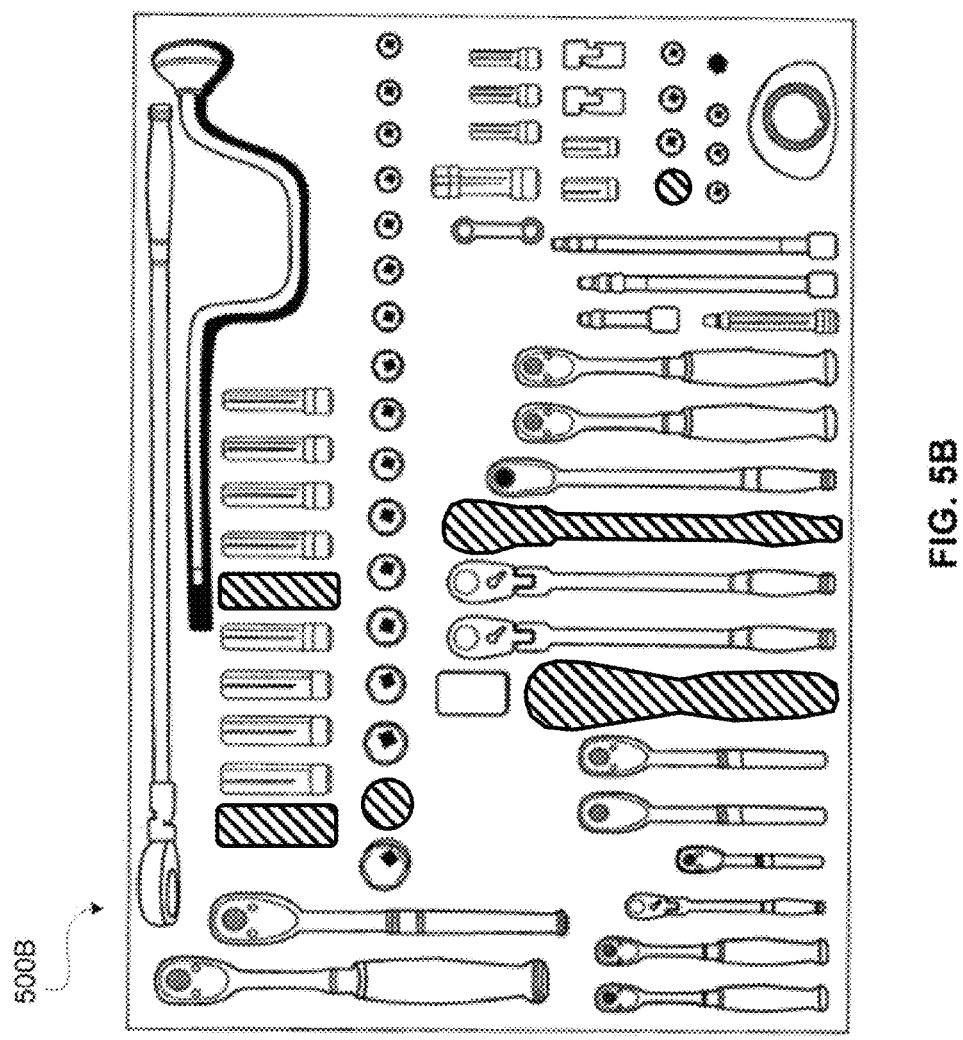
FIG. 5B illustrates an exemplary GUI with a silhouette according to some embodiment of this disclosure.

When the user is ready to return the tool after use, the user logs into the tool control storage device 106. When the user is authenticated, a list of tools currently issued (i.e., checked out from the toolbox) may be provided on a screen of a toolbox, as illustrated at the circled number 1 in the GUI 500A of FIG. 5A. The circled number 2 in the GUI 500A of FIG. 5A illustrates a graphical image depicting the toolbox provided along with the list of currently issued tools on the screen. To further facilitate the process, the graphical image of the toolbox may include graphical images of drawers, and the drawer from which the tools were issued may be highlighted. When the appropriate drawer from which the tools were issued is opened, an image of the actual drawer layout with the silhouettes of the issued tools highlighted may be displayed on the screen, as illustrated in the GUI 500B of FIG. 5B. Based on the visual guidance, the user returns the tool to the tool storage location in the actual drawers 330 that corresponds to the highlighted tool storage location displayed on the screen.

Once the user returns the tool to the toolbox, the system performs the RFID-based inventory scan and/or the image-based inventory scan of the drawer 330 to which the tool was returned. If the results of the RFID-based inventory scan and the image-based inventory scan indicate that no tool is missing (e.g., tool is returned to its appropriate tool storage location), the returning process is completed.

The visual guidance to assist the users to return tools to their appropriate tool storage location within the toolboxes does not rely on the user's familiarity with the tools in each drawer 330 and on the labels physically placed on the toolbox drawer 330 so that the user can identify the drawer 330 that includes the tool that the user desires to check-out. That is, this retuning process allows the user to easily identify the appropriate tool storage location. This returning process reduces a false-positive rate of determining whether any tools are missing from the toolboxes, and also reduces the time spent for returning the tools.

Figure 6A:
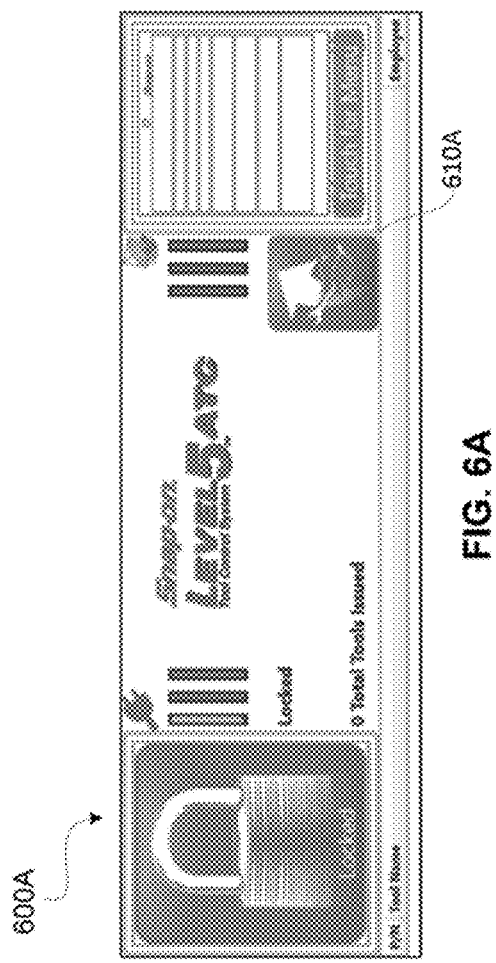
FIGS. 6A, 6B and 6C illustrate an exemplary image of a graphical user interface according to some embodiment of this disclosure.
Figure 6B:
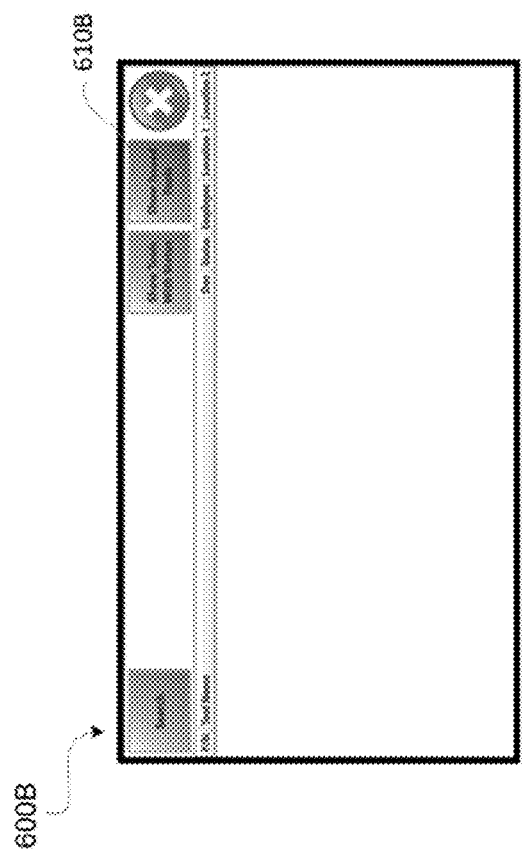
Figure 6C:
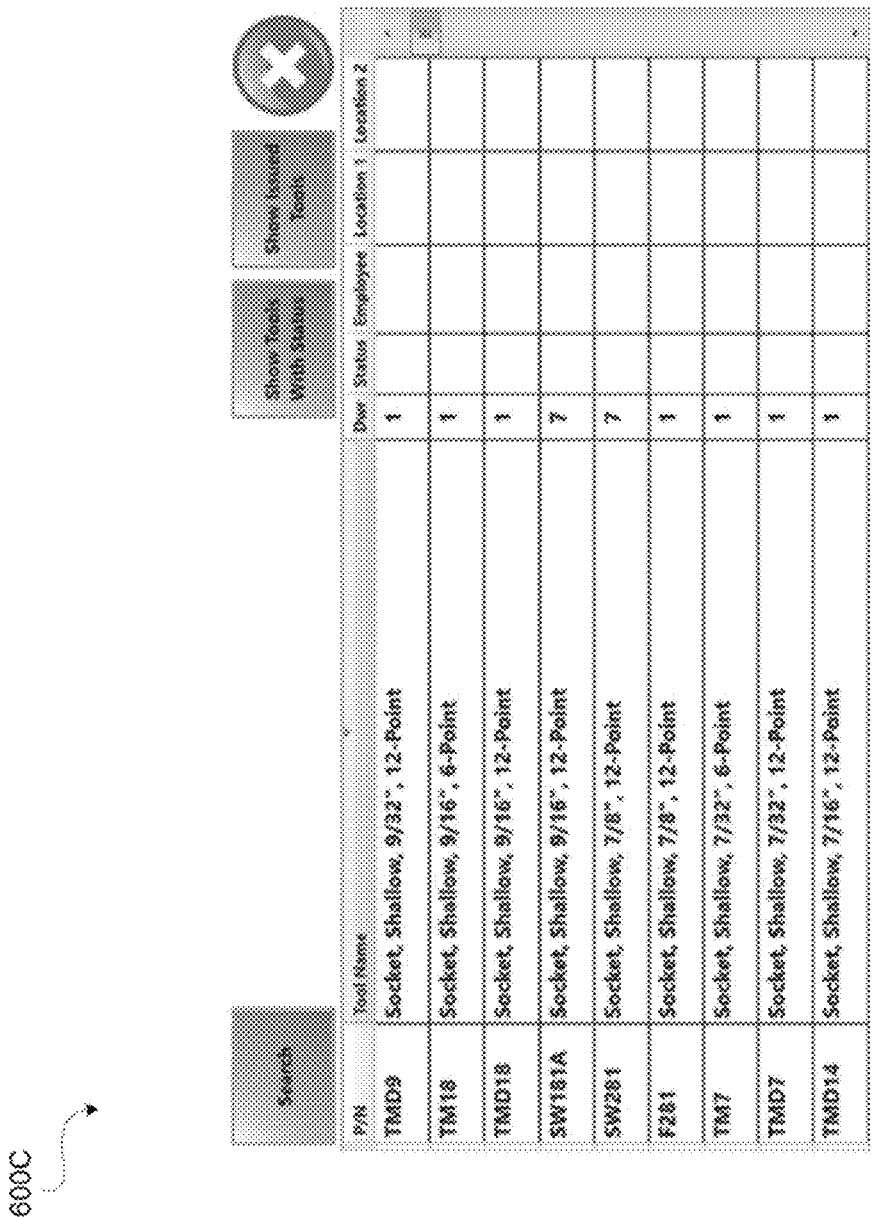

However, unlike the returning process, the currently implemented check-out process for checking tools out from the toolboxes relies on the user's familiarity and the labels on the toolbox drawers 330. FIGS. 6A-6C illustrate exemplary graphical user interfaces (GUI) for the currently implemented tool check-out process.

The currently implemented check-out process starts with searching for a tool. For example, a two-step tool search mode may be launched by receiving a user selection at the "Tool Search" icon 610A in GUI 600A of FIG. 6A. When the "Tool Search" icon 610A is selected, the "Tool Search Window" in GUI 600B of FIG. 6B is provided for display on the screen. When the "Show Issued Tools" icon 610B in GUI 600B is selected, the tool inventory list as illustrated in GUI 600C of FIG. 6C is displayed on the screen. The tool inventory list may include tool attributes, such as the part number (P/N), tool name, assigned drawer, status, and the like. The tool inventory list may be sorted by the desired attribute.

However, the currently implemented tool check-out process requires the user to be familiar with the tools and their respective tool storage locations within each drawer 330 of the tool control storage device 106, or the user relies on the labels physically placed on the drawer 330 that describe drawer contents. The currently implemented tool check-out process is time consuming and not intuitive.

The tool check-out process according to the subject technology reduces the search time and increases work efficiency by displaying the primary contents over the graphical image depicting the toolbox on the user interface 305 of the tool control storage device 106. The tool check-out process allows the users to identify the drawer that contains the desired tool on the device GUI.

Figure 7:
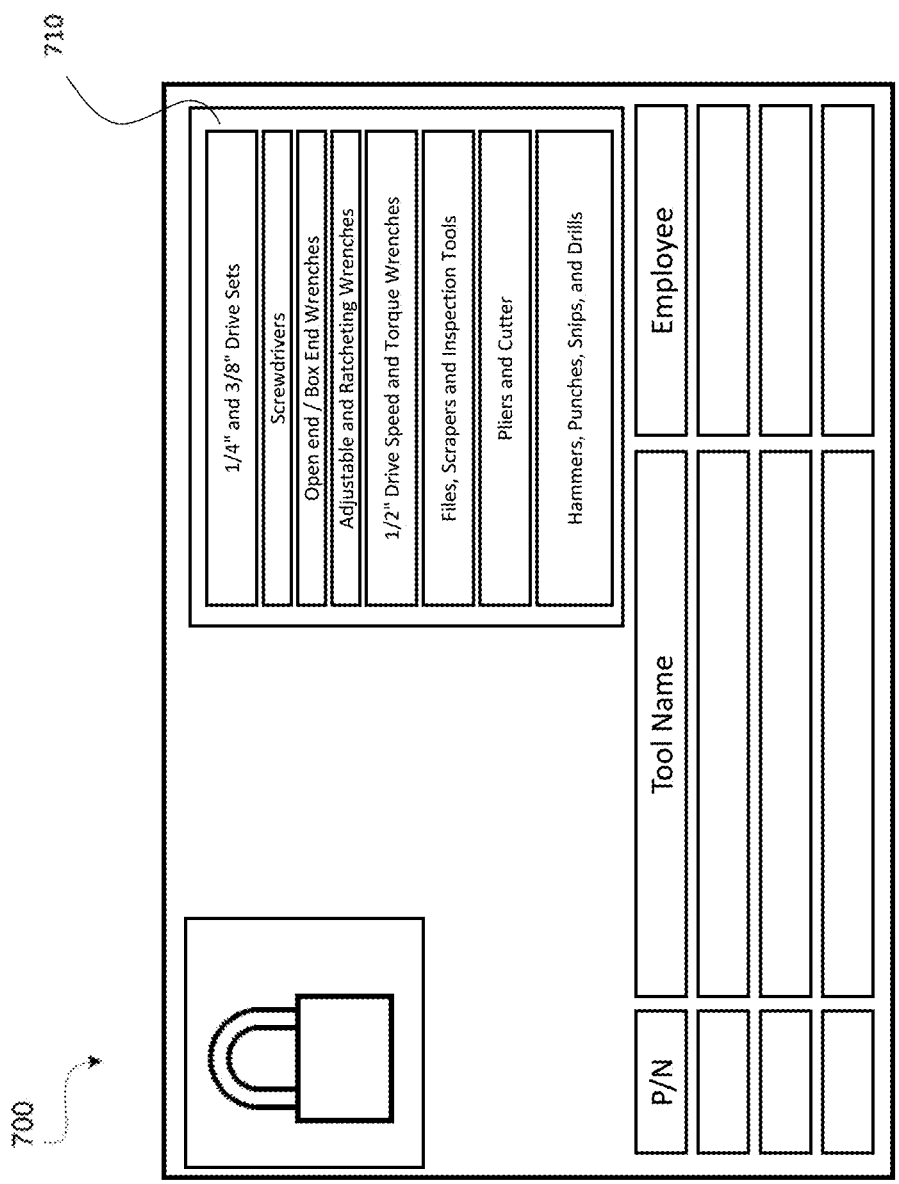
FIG. 7 illustrates an exemplary GUI for the tool check-out process according to the subject technology.

FIG. 7 illustrates an exemplary GUI 700 for the tool check-out process according to the subject technology. When a user's login is authenticated, the ATC system 100 provides the GUI 700 for display on the user interface 305 of the tool control storage device 106. The GUI 700 may be a dashboard screen to allow the users to control the tool control storage device 106 and provide information about the tool control storage device 106. The dashboard screen may include a graphical image 710 depicting the tool control storage device 106. The number and sizes of the drawers to be displayed on the GUI 700 may be defined in the configuration of the assembly process of the tool control storage device 106. The ATC system may refer to the number and sizes defined in the configuration, and determine the number and sizes of the drawers to be displayed in the GUI 700.

That is, the graphical image 710 may include the same number of the drawers 330 and the relative sizes of the drawers 330 of the actual tool control storage device 106. For example, when the actual tool control storage device 106 includes eight drawers, the graphical image 710 may also depict eight drawers. When the bottom drawer of the tool control storage device 106 is the largest drawer of all the drawers of the actual tool control storage device 106, more space is allocated for the bottom drawer than the rest of the drawers displayed in the GUI 700.

Further, a text block is overlaid upon each of the drawers displayed in the GUI 700. The text block may include text describing the contents of the respective drawers. For example, the text block overlaid upon the top drawer displayed in the graphical image 710 of the GUI 700 includes the text—¼" and ⅜" Drive Sets—that describe the contents of the top drawer of the actual tool control storage device 106.

The text to be included in the text block may be assigned using the device setting features in the administrative software client application. For example, the administrator accesses the administrative software client application on the computing device 102. The administrative software client application may default to the dashboard screen (e.g., GUI 700). The dashboard screen may include tabs to navigate through pages. For example, the dashboard screen may be include a Boxes tab, which when clicked, navigates the administrator to a Boxes page where the administrator may select a desired toolbox to modify.

The Boxes tab may further include a subset of tabs used to set up the selected toolbox's functions. For example, the administrator may select a "Drawer Label" tab from the subset of tabs in the Boxes tab to edit the drawer labels to be displayed for the dashboard screen. In the "Drawer Label" tab, the text block overlaid upon each of the drawers displayed in the graphical image 710 of the GUI 700 may be edited. For example, the administrator may assign text describing the contents of a drawer 330 to a text block that corresponds to the drawer 330 of the actual tool control storage device 106.

In some embodiments, a drawer number corresponding to a drawer 330 of the actual tool control storage device 106 and a text box for entering text to be displayed in the text block overlaid upon the corresponding drawer 330 may be displayed as a table in the "Drawer Label" tab. As described above, the number of drawers reflects the number of drawers originally set up in the box configuration process during initial setup of the actual tool control storage device 106. To complete the editing of the text blocks, the administrator may select a "Save Changes" button.

Once the "save Changes" button is selected, the ATC software application and the ATC service update the toolbox configuration using the network (i.e., network 108). When the dashboard screen is launched the next time, the text assigned for each drawer in the Boxes/Drawer Label tab is automatically displayed in the appropriate drawer text boxes in the "Touch for Menu" Toolbox icon as seen in the GUI 700 of the FIG. 7.

In some embodiments, the ATC system may include a program, which when executed, determines the primary contents of each drawer. For example, the ATC system scans keywords used in the items descriptions contained in each text file and tracks the numbers of time the keyword appears in the item descriptions. The text files are used to assign the inventory to each of the drawers of the toolboxes.

For example, a drawer stores open-end wrenches and box-end wrenches. The drawer is assigned the inventory using the text files describing the open-end wrenches and the box-end wrenches. Thus, the ATC system may determine that the keyword "wrench" appears more frequently than the other keywords, such as "open-end" and "box-end." Based on the determination, the ATC system may assign "wrench" as one of the terms to be displayed in the text block in the dashboard screen.

In another example, when the drawer stores screwdrivers or pliers, the ATC system may identify the most used keyword as "screwdrivers" or "pliers." Thus, the text block for the drawer may include the keywords "screwdrivers" or "pliers", and the ATC system may automatically display the drawer label "screwdrivers" or "pliers" on the dashboard screen.

In some embodiments, the process determining the keywords to include in the text blocks may be invoked at the same time as the drawer text files are loaded into the ATC system and the labels automatically appear on the drawers in the tool box icon shown in the dashboard.

The determining process may be based on the part numbers of the tools stored in the drawers. For example, most frequently used part numbers may be identified by referencing the part numbers to the descriptors in the database and using the primary descriptor word in each part numbers description FIG. 8 conceptually illustrates an exemplary electronic system 800 with which some implementations of the subject technology can be implemented. In one or more implementations, the computing device 102 and the tool control storage devices 106 may be, or may include all or part of, the electronic system components that are discussed below with respect to the electronic system 800. The electronic system 800 can be a computer, phone, personal digital assistant (PDA), or any other sort of electronic device. Such an electronic system includes various types of computer readable media and interfaces for various other types of computer readable media. The electronic system 800 includes a bus 808, processing unit(s) 812, a system memory 804, a read-only memory (ROM) 810, a permanent storage device 802, an input device interface 814, an output device interface 806, and a network interface 816.

The bus 808 collectively represents all system, peripheral, and chipset buses that communicatively connect the numerous internal devices of the electronic system 800. For instance, the bus 808 communicatively connects the processing unit(s) 812 with the ROM 810, system memory 804, and permanent storage device 802.

From these various memory units, the processing unit(s) 812 retrieves instructions to execute and data to process in order to execute the processes of the subject disclosure. The processing unit(s) can be a single processor or a multi-core processor in different implementations.

The ROM 810 stores static data and instructions that are needed by the processing unit(s) 812 and other modules of the electronic system. The permanent storage device 802, on the other hand, is a read-and-write memory device. This device is a non-volatile memory unit that stores instructions and data even when the electronic system 800 is off. Some implementations of the subject disclosure use a mass-storage device (for example, a magnetic or optical disk, or flash memory) as the permanent storage device 802.

Other implementations use a removable storage device (for example, a floppy disk, flash drive) as the permanent storage device 802. Like the permanent storage device 802, the system memory 804 is a read-and-write memory device. However, unlike the storage device 802, the system memory 804 is a volatile read-and-write memory, such as a random access memory. The system memory 804 stores some of the instructions and data that the processor needs at runtime. In some implementations, the processes of the subject disclosure are stored in the system memory 804, the permanent storage device 802, or the ROM 810. For example, the various memory units include instructions for displaying graphical elements and identifiers associated with respective applications, receiving a predetermined user input to display visual representations of shortcuts associated with respective applications, and displaying the visual representations of shortcuts. From these various memory units, the processing unit(s) 812 retrieves instructions to execute and data to process in order to execute the processes of some implementations.

The bus 808 also connects to the input and output device interfaces 814 and 806. The input device interface 814 enables the user to communicate information and select commands to the electronic system. Input devices used with the input device interface 814 include, for example, alphanumeric keyboards and pointing devices (also called "cursor control devices"). The output device interface 806 enables, for example, the display of images generated by the electronic system 800. Output devices used with the output device interface 806 include, for example, printers and display devices, for example, cathode ray tubes (CRT) or liquid crystal displays (LCD). Some implementations include devices, for example, a touchscreen that functions as both input and output devices.

Figure 8:
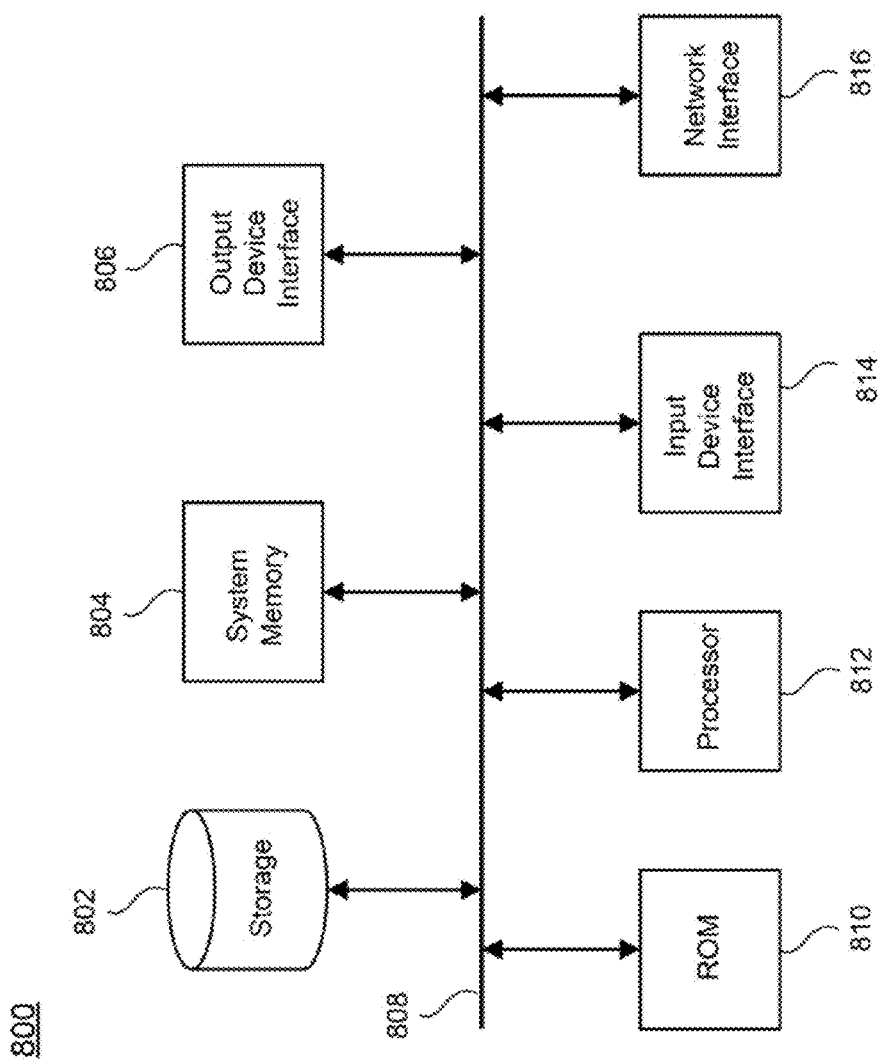
FIG. 8 conceptually illustrates an exemplary electronic system with which some implementations of the subject technology can be implemented.

Finally, as shown in FIG. 8, the bus 808 also couples the electronic system 800 to a network (not shown) through a network interface. In this manner, the computer can be a part of a network of computers (for example, a LAN, a WAN, or an Intranet, or a network of networks, for example, the Internet). Any or all components of the electronic system 800 can be used in conjunction with the subject disclosure.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, magnetic media, optical media, electronic media, etc. The computer readable media does not include carrier waves and electronic signals passing wirelessly or over wired connections.

Unless otherwise stated, all measurements, values, ratings, positions, magnitudes, sizes, and other specifications that are set forth in this specification are approximate, not exact. They are intended to have a reasonable range that is consistent with the functions to which they relate and with what is customary in the art to which they pertain.

Except as stated immediately above, nothing that has been stated or illustrated is intended or should be interpreted to cause a dedication of any component, step, feature, object, benefit, advantage, or equivalent to the public.

In this specification, the term "software" is meant to include, for example, firmware residing in read-only memory or other form of electronic storage, or applications that may be stored in magnetic storage, optical, solid state, etc., which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware, or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example, microprocessors, storage, and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra-density optical discs, any other optical or magnetic media, and floppy disks. The computer-readable media can store a computer program that is executable by at least one processing unit and includes sets of instructions for performing various operations. Examples of computer programs or computer code including machine code, for example, produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself.

As used in this disclosure, the terms "computer", "server", "processor", and "memory" all refer to electronic or other technological devices. These terms exclude people or groups of people. For the purposes of the specification, the terms display or displaying means displaying on an electronic device. As used in this disclosure, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT or LCD monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Where reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

To the extent that the systems discussed herein collect usage data associated with users, or may make use of the usage data, the users are provided with opportunities to control whether programs or features collect usage data (e.g., a user's preferences), and to control the user interface (UI) associated with applications based on the collected usage data. The users may also be provided with options to turn on or turn off certain features or functions provided by the systems. In some aspects, the users may elect to disable features and functions (e.g., control the UI associated with applications based on the collected usage data) offered by the systems discussed herein. In addition, users may stipulate that certain data be treated in one or more ways before it is stored or used, so that personally identifiable information is removed. For example, a user's identity may be treated so that no personally identifiable information can be determined for the user, or a user's geographic location may be generalized where location information is obtained (such as to a city, zip code, or state level), so that a particular location of a user cannot be determined. Thus, the user has control over whether and how user information is collected, stored, and used by the disclosed systems.

An embodiment of the disclosure is an inventory control system that comprises an object storage device, a display device, and one or more processors. The object storage device includes a plurality of compartments, in which each compartment has a plurality of storage locations for storing objects. The display device is configured to display information about the object storage device. The one or more processors are configured to establish a description database of objects configured for storage in the inventory control system. The one or more processors retrieve object keywords corresponding to objects stored in the plurality of storage locations of one of the plurality of compartments. The one or more processors also generate a text block based on the retrieved object keywords. On the display device, the one or more processors display a representation of the plurality of compartments of the object storage device with the text block applied to the one of the plurality of compartments.

In some embodiments, the plurality of compartments are a plurality of drawers. In other embodiments, on the display device, the display of the representation of the plurality of compartments of the object storage device reflects relative locations and sizes of the respective compartments. In certain embodiments, the text block is applied to the one of the plurality of compartments by being overlaid on the display of the one of the plurality of compartments. In some embodiments, the text block is generated based on user input to an administrative application. In other embodiments, the text block is automatically generated based on a number of instances of a keyword in the retrieved object keywords. In certain embodiments, the display device is further configured to receive input from users to access stored objects. In an embodiment, a number of the drawers to be displayed and a text box for entering text to be displayed in the text block overlaid upon corresponding drawer are displayed as a table. In a particular embodiment, the processor is further configured to identify a most frequently used object of the one of the plurality of compartments based on the description database. the text block is generated to include a keyword corresponding to the most frequently used object.

Another embodiment of the disclosure is a method. The method comprises storing objects in an object storage device including a plurality of compartments, each compartment including a plurality of storage locations for storing objects. Then, a description database of objects configured for storage in the inventory control system is stored. Subsequently, object keywords corresponding to objects stored in the plurality of storage locations of one of the plurality of compartments are retrieved. A text block is then generated based on the retrieved object keywords. At the object storage device, user input is received that corresponds to a request for access to an object stored in the one of the plurality of compartments. Finally, on a display device, a representation of the plurality of compartments of the object storage device is displayed with the text block applied to the one of the plurality of compartments.

In some embodiments, the plurality of compartments are a plurality of drawers. In other embodiments, on the display device, the display of the representation of the plurality of compartments of the object storage device reflects relative locations and sizes of the respective compartments. In certain embodiments, the text block is applied to the one of the plurality of compartments by being overlaid on the display of the one of the plurality of compartments. In some embodiments, the text block is generated based on user input to an administrative application, In other embodiments, the text block is automatically generated based on a number of instances of a keyword in the retrieved object keywords. In an embodiment, a number of the drawers to be displayed and a text box for entering text to be displayed in the text block overlaid upon corresponding drawer are displayed as a table. In a particular embodiment, a most frequently used object of the one of the plurality of compartments is identified based on the description database. In such an embodiment, the text block is generated to include a keyword corresponding to the most frequently used object.

All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. Furthermore, to the extent that the term "include", "have", or the like is used in the disclosure, such term is intended to be inclusive in a manner similar to the term "comprise" as "comprise" is interpreted.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

In the foregoing Description, it can be seen that various features are grouped together in various embodiments for the purpose of streamlining the disclosure.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended that this disclosure cover any and all applications, modifications and variations that fall within the true scope of the present teachings.

What is claimed is:

1. An inventory control system comprising:
   an object storage device including a plurality of compartments, each compartment including a plurality of storage locations for storing objects;
   a display device configured to display information about the object storage device;
   and
   one or more processors configured to:
   establish a description database of objects configured for storage in the inventory control system;
   retrieve object keywords corresponding to objects stored in the plurality of storage locations of one of the plurality of compartments;
   generate a text block based on the retrieved object keywords; and display, on the display device, a representation of the plurality of compartments of the object storage device with the text block applied to the one of the plurality of compartments; and
   identify a most frequently used object of the one of the plurality of compartments based on the description database, wherein the text block is generated to include a keyword corresponding to the most frequently used object.

2. The inventory control system of claim 1, wherein the plurality of compartments are a plurality of drawers.

3. The inventory control system of claim 1, wherein the display, on the display device, of the representation of the plurality of compartments of the object storage device reflects relative locations and sizes of the respective compartments.

4. The inventory control system of claim 1, wherein the text block is applied to the one of the plurality of compartments by being overlaid on a display associated with the one of the plurality of compartments.

5. The inventory control system of claim 1, wherein the text block is generated based on user input to an administrative application.

6. The inventory control system of claim 1, wherein the text block is generated automatically based on a number of instances of a keyword in the retrieved object keywords.

7. The inventory control system of claim 1, wherein the display device is further configured to receive input from users to access stored objects.

8. The inventory control system of claim 1, wherein a number of the drawers to be displayed and a text box for entering text to be displayed in the text block overlaid upon corresponding drawer are displayed as a table.

9. A method, comprising:
- storing objects in an object storage device including a plurality of compartments, each compartment including a plurality of storage locations for storing objects;
- storing a description database of objects configured for storage in the inventory control system;
- retrieving object keywords corresponding to objects stored in the plurality of storage locations of one of the plurality of compartments;
- generating a text block based on the retrieved object keywords;
- receiving user input, at the object storage device, that corresponds to a request for access to an object stored in the one of the plurality of compartments;
- displaying, on a display device, a representation of the plurality of compartments of the object storage device with the text block applied to the one of the plurality of compartments; and
- identifying a most frequently used object of the one of the plurality of compartments based on the description database, wherein the text block is generated to include a keyword corresponding to the most frequently used object.

10. The method of claim 9, wherein the plurality of compartments are a plurality of drawers.

11. The method of claim 9, wherein the display, on the display device, of the representation of the plurality of compartments of the object storage device reflects relative locations and sizes of the respective compartments.

12. The method of claim 9, wherein the text block is applied to the one of the plurality of compartments by being overlaid on a display associated with the plurality of compartments.

13. The method of claim 9, wherein the text block is generated based on user input to an administrative application.

14. The method of claim 9, wherein the text block is generated automatically based on a number of instances of a keyword in the retrieved object keywords.

15. The method of claim 9, wherein a number of the drawers to be displayed and a text box for entering text to be displayed in the text block overlaid upon corresponding drawer are displayed as a table.

* * * * *